Patented Nov. 3, 1936

2,059,903

UNITED STATES PATENT OFFICE 2,059,903

WATER INSOLUBLE AZO DYESTUFFS AND THEIR PRODUCTION

Pierre Petitcolas, Rouen, France, assignor to Compagnie Nationale de Matières Colorantes et Manufactures de Produits Chimiques du Nord Réunies, Etablissements Kuhlmann, Paris, France, a corporation of France No Drawing. Application August 4, 1934, Serial No. 738,539. In France August 10, 1933

4 Claims. (Cl. 260—95)

It has been found in accordance with the present invention that it is possible to obtain azodyestuffs insoluble in water and of great technical value by diazotizing aromatic bases of the general formula:

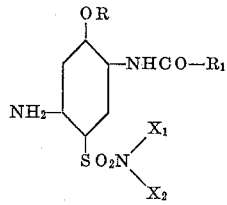

in which R is a low alkyl group, $R_1$ is a radicle of the group consisting of alkyls and aryls, $X_1$ and $X_2$ are hydrogen atoms or lower alkyl groups and by coupling, in substance or on the fibre, the diazo compounds thus obtained with coupling components having an affinity for cotton.

As coupling components of this type there can be used in particular the arylides of β-hydroxynaphthoic acid, hydroxyanthracene-carboxylic acid, hydroxycarbazole-carboxylic acid or diaceto-acetyl derivatives of p-diamines of the diphenyl series or other substantive components.

The aromatic bases corresponding to the general formula given above can be easily obtained by subjecting to nitration in an organic solvent medium, compounds of the general formula:

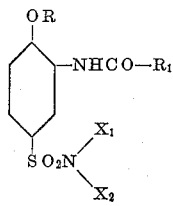

in which R, $R_1$, $X_1$, $X_2$ have the same significance as above, and then reducing the nitro-derivatives thus obtained to their corresponding amines.

The following examples illustrate the invention without limiting the same thereto:—

Example 1

115 grams of 1-methoxy-2-benzoyl-amino-4-diethyl-sulph-amido benzene are dissolved in 1000 ccs. of chlorobenzene. Heating is effected to 70° C. and there are introduced within 1 hour 40 grams of nitric acid of 48° Bé. The whole is maintained for 3 hours at 70–75° C., then after standing for 24 hours the chlorobenzene solution is washed first with water and then with a dilute solution of sodium carbonate. The solvent is steam distilled and the nitro derivative crystallizes. It is produced after recrystallization from alcohol in the form of fine clear yellow needles which melt at 150° C.

|  | Calculated for $C_{18}H_{21}O_6N_3S$ | Found |
|---|---|---|
| Per cent N | 10.3 | 10.2 |

The nitro derivative is reduced by iron and acetic acid according to the known processes. By extraction with a solvent a very pure base is isolated which, recrystallized from alcohol, melts at 153° C.

|  | Calculated for $C_{18}H_{23}O_4N_3S$ | Found |
|---|---|---|
| Per cent N | 11.1 | 10.9 |
| Per cent S | 8.5 | 8.4 |

Example 2

5 grams of the 4-chloro-o-anisidide of 2,3-hydroxynaphthoic acid are pasted with 15 ccs. of denatured alcohol and 2 ccs. of caustic soda of 34° Bé.

A limpid solution is rapidly obtained. There are then added 2.5 ccs. of 33% formaldehyde.

After standing for 5 minutes this solution is poured into 1 litre of cold soft water previously provided with 5.5 ccs. of caustic soda 34° Bé. and 5 ccs. of Turkey red oil 50%.

50 grams of cotton yarn are treated for half an hour at 25–30° C. in this impregnating bath, wrung out and immediately developed in the developing bath prepared in the following manner:

3.8 grams of 1-methoxy-2-benzoyl-amino-4-diethyl - sulphonamide - 5 - amino - benzene, obtained in Example 1, are pasted with 10 ccs. of hot water and 0.76 gram of sodium nitrite. This paste is cooled to 15° C. and introduced in small portions with brisk stirring into 90 ccs. of water at 15° C. containing 3.1 ccs. of hydrochloric acid 20° Bé.

After 1 hour's stirring at a temperature of 15–17° C. 15.5 ccs. are added of a 10% solution of sodium acetate. The diazo solution obtained is then poured into the quantity of cold water necessary to make up the volume to 1 litre and previously provided with 1.55 grams of aluminium sulphate and 50 grams of common salt.

The duration of the development is half an hour in the cold. Then the skein of cotton is rinsed, treated with acid, rinsed, soaped for half an hour at boiling point in a bath containing 5 grams of Marseilles soap per litre, rinsed and dried.

A Bordeaux shade is obtained of excellent fastness to chlorine and light and of perfect resistance to the action of alkali lyes even under pressure.

*Example 3*

4 grams of the α-naphthylamide of 2,3-hydroxynaphthoic acid are pasted with 5 ccs. of denatured alcohol and 2.4 ccs. of caustic soda of 34° Bé.

The whole is diluted with 6 ccs. of cold water.

A limpid solution is obtained to which are added 2 ccs. of 33% formaldehyde. After standing for 5 minutes this solution is poured into 1 litre of cold water previously provided with 5.6 ccs. of caustic soda 34° Bé. and 5 ccs. of Turkey red oil 50%.

50 grams of cotton yarn are treated for half an hour at 25–30° C. in this impregnating bath then squeezed out, developed and the dyeing completed as indicated in Example 2.

A full garnet shade is obtained of excellent fastness to chlorine, light and dilute soda under pressure.

*Example 4*

2 grams of the β-naphthylamide of 2,3-hydroxynaphthoic acid are pasted with 2.4 ccs. of denatured alcohol, 0.8 cc. of caustic soda 34° Bé. and 2 ccs. of cold water.

A limpid solution is rapidly obtained to which is added with stirring 1 cc. of 33% formaldehyde. After standing for 5 minutes this solution is poured into 1 litre of cold soft water previously provided with 5.2 ccs. of caustic soda 34° Bé. and 5 ccs. of Turkey red oil 50%.

50 grams of cotton yarn are treated for half an hour at 25–30° C. in this impregnating bath, then squeezed out, developed and the dyeing completed as described in Example 2.

An extremely bright corinth shade is obtained of excellent fastness properties.

The remarkable fastness properties of the shades obtained render the above mentioned products compounds of great importance. As a matter of fact only few combinations are known which unite to this degree all fastness properties and in particular in the Bordeaux and corinth scale of shades.

What I claim is:

1. Process for the preparation of azodyestuffs insoluble in water consisting in diazotizing aromatic bases of the general formula:

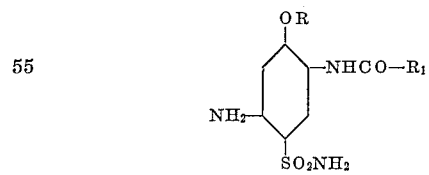

in which R is a lower alkyl group and $R_1$ is a radicle of the benzene series and in coupling the diazo compounds thus obtained with ice color coupling components.

2. Process for the preparation of azodyestuffs insoluble in water consisting in diazotizing aromatic bases of the general formula:

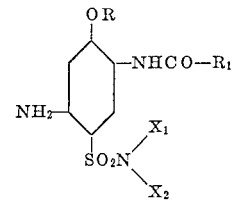

in which R is a lower alkyl group, $R_1$ is a radicle of the benzene series, $X_1$ and $X_2$ are elements of the group consisting of hydrogen atoms and the lower alkyl groups and in coupling the diazo compounds thus obtained with ice color coupling components.

3. Process for the preparation of azodyestuffs insoluble in water consisting in diazotizing aromatic bases of the general formula:

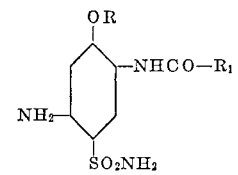

in which R is a lower alkyl group and $R_1$ is a radicle of the benzene series and in coupling the diazo compounds thus obtained with coupling components, selected from the group consisting of the arylides of β-hydroxynaphthoic acid, hydroxyanthracene-carboxylic acid, hydroxycarbazole-carboxylic acid and diaceto-acetyl derivatives of p-diamines of the diphenyl series.

4. The water insoluble azodyestuffs obtained by coupling of a diazo compound of an aromatic base of the following general formula:

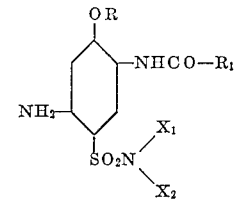

in which R is a lower alkyl group and $R_1$ is a radicle of the benzene series, $X_1$ and $X_2$ are elements of the group consisting of hydrogen atoms and the lower alkyl groups with components selected from the group consisting of the arylides of the β-hydroxynaphthoic acid, hydroxyanthracene carboxylic acid, hydroxycarbazole carboxylic acid, and diaceto-acetyl derivatives of p-diamines of the diphenyl series.

PIERRE PETITCOLAS.